(12) United States Patent
Chen et al.

(10) Patent No.: US 6,424,390 B1
(45) Date of Patent: Jul. 23, 2002

(54) LIQUID CRYSTAL DISPLAY PANEL STRUCTURE

(75) Inventors: Ying-Hu Chen; Po-An Lin; Chung-Pi Lee, all of Taipei (TW)

(73) Assignee: Compal Electronics, Taipei (TW)

( * ) Notice: Subject to any disclaimer, the term of this patent is extended or adjusted under 35 U.S.C. 154(b) by 0 days.

(21) Appl. No.: 09/285,799

(22) Filed: Apr. 5, 1999

(51) Int. Cl.[7] ............................................. G02F 1/1333
(52) U.S. Cl. ...................................................... 349/58
(58) Field of Search .............................. 349/58, 1, 11; 345/1, 55, 205, 905; D14/315; 361/681

(56) References Cited

U.S. PATENT DOCUMENTS 6,002,582 A * 12/1999 Yeager et al. ............... 361/681

* cited by examiner

Primary Examiner—William L. Sikes
Assistant Examiner—Timothy L Rude
(74) Attorney, Agent, or Firm—Bacon & Thomas

(57) ABSTRACT

A liquid crystal display panel structure in which each of two insertion strips has a fixing face and sliding face. The sliding face is slidably fitted with an insertion section of a casing. After a liquid crystal display face fixed with the insertion strips is placed into the casing, the sliding faces of the insertion strips coincide with the insertion sections. After the display face is slid toward one end of the casing, the sliding faces are inserted into clearances defined by the insertion sections. The insertion sections of the casing further include at feast one locating post. The insertion strip is formed with a locating hole corresponding to the locating post, whereby the display face can be more easily and quickly assembled to the casing.

3 Claims, 7 Drawing Sheets

LIQUID CRYSTAL DISPLAY PANEL STRUCTURE

BACKGROUND OF THE INVENTION

The present invention relates to a liquid crystal display panel structure which has an assembling structure enabling the liquid crystal display face to be more easily and quickly assembled with the casing.

FIG. 1 shows a conventional portable computer including a liquid crystal display panel 10 and a main body 20. FIG. 2 is a perspective exploded view of the display panel 10 of the portable computer. The display panel 10 includes a liquid crystal display face 100, two insertion strips 102, a casing 104 and an outer housing 105. Two sides of the display face 100 are formed with thread holes 106. The casing 104 defines a receiving space 108 and is formed with thread holes 110 on two sides. The insertion strip 102 is a substantially L-shaped structure. One side of the insertion strip 102 is formed with multiple fixing holes 112 corresponding to the thread holes 106, whereby the insertion strips 102 can be fixed on the display face 100 by screws 114. In addition, the other side of the insertion strip 102 is formed with multiple fixing holes 116 corresponding to the thread holes 110 of the casing 104, whereby the insertion strips 102 fixed with the display face 100 can be secured on the casing 104 by screws 118.

When assembling the display panel 10, the display face 100 fixed with the insertion strips 102 must be cautiously locked on the casing 104. Otherwise, the locking tool (not shown) is likely to touch and damage the display face 100. Therefore, it is laborious and time-consuming to complete the locking operation. However, it still often takes place that the display face 100 is incautiously damaged.

SUMMARY OF THE INVENTION

It is therefore a primary object of the present invention to provide a liquid crystal display panel structure which can be more easily and quickly assembled without damaging the display face.

The present invention can be best understood through the following description and accompanying drawings wherein:

DETAILED DESCRIPTION OF THE PREFERRED EMBODIMENT

Figure 1:
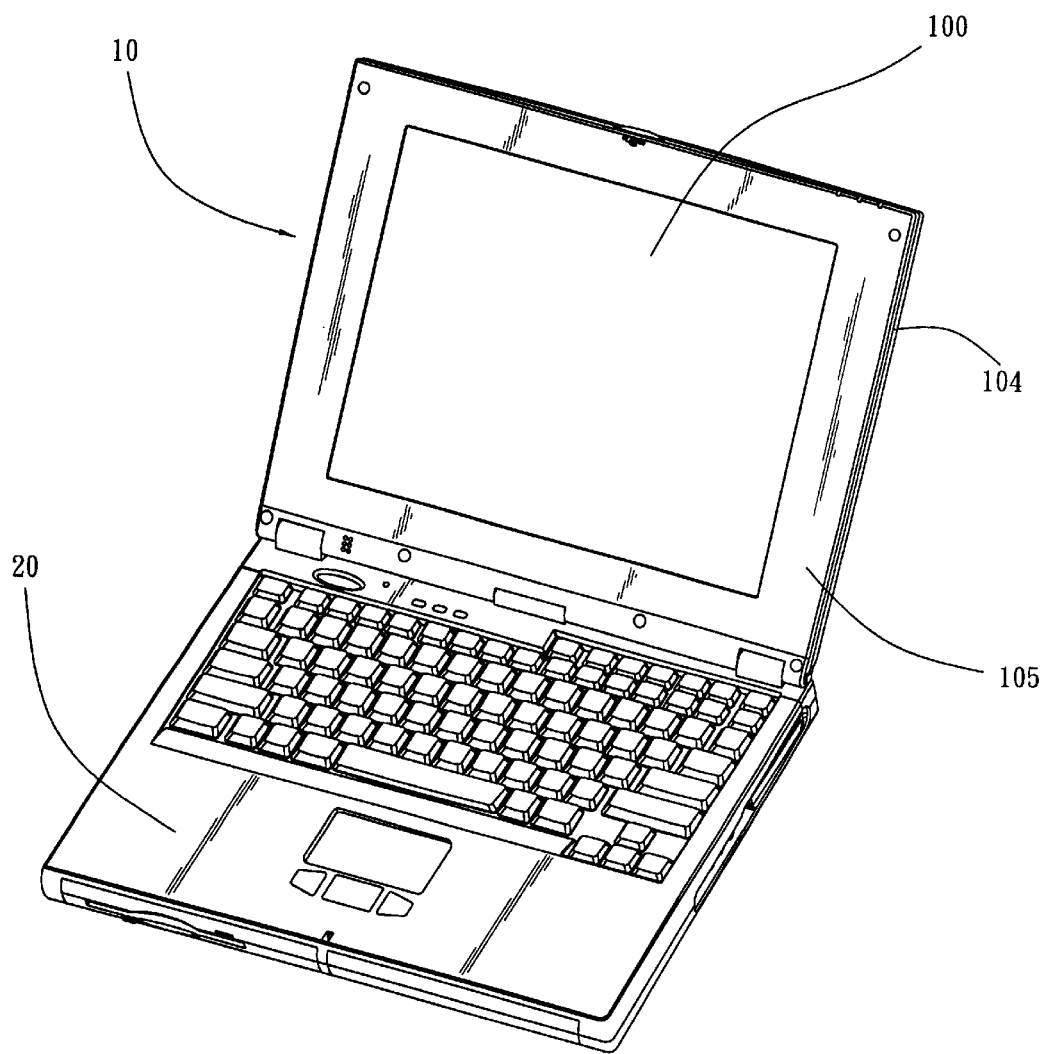
FIG. 1 a perspective view of a conventional portable computer.
Figure 2:
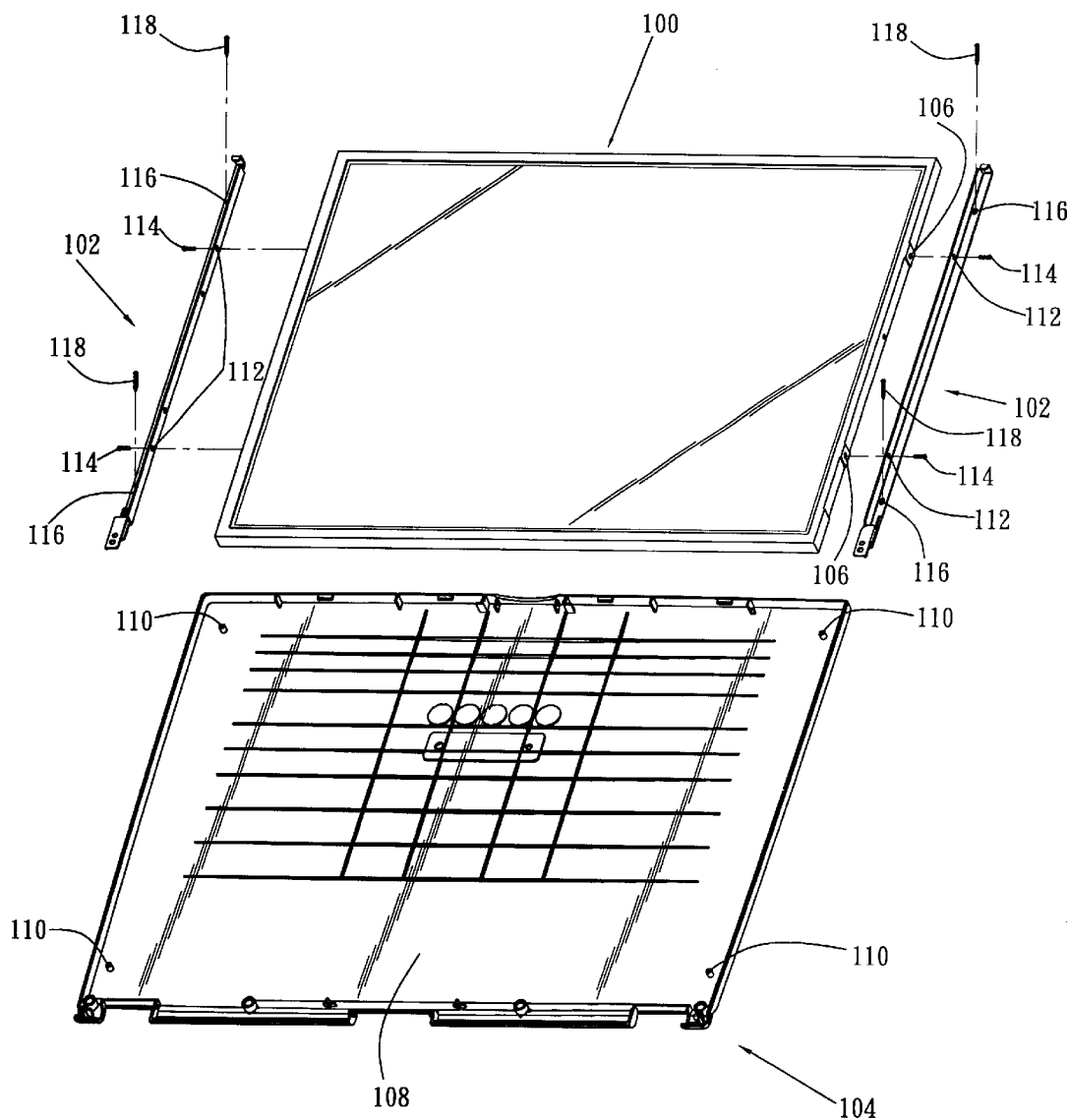
FIG. 2 is a perspective exploded view of a conventional liquid crystal display panel of the conventional portable computer.
Figure 3:
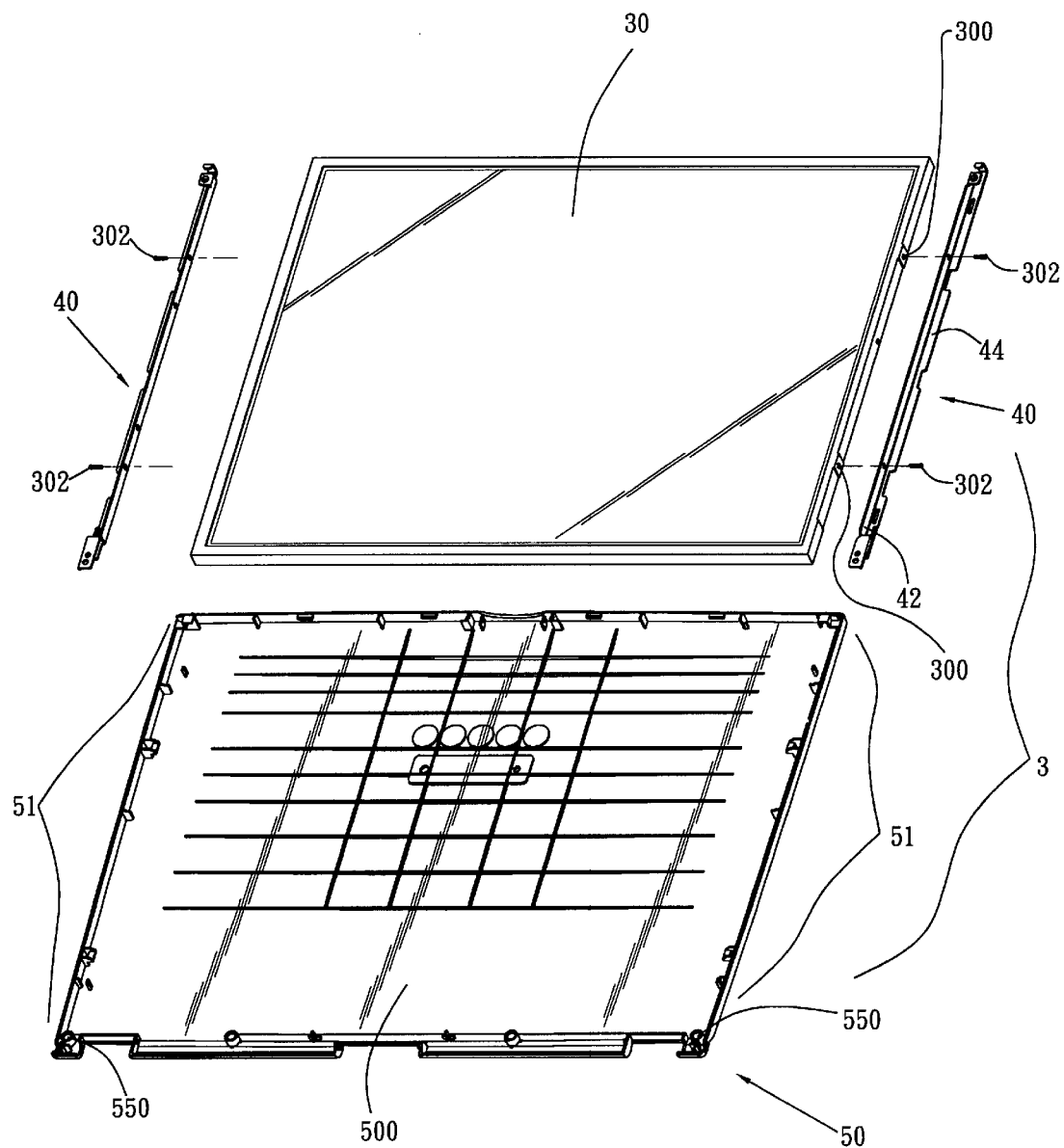
FIG. 3 is a perspective exploded view of the liquid crystal display panel of the portable computer of the present invention.

Please refer to FIG. 3. The liquid crystal display panel 3 of the present invention includes a liquid crystal display face 30, two insertion strips 40, a casing 50 and an outer housing (not inevitable and thus not shown). Two sides of the display face 30 are formed with two thread holes 300. The casing 50 defines a receiving space 500 and is formed with two insertion sections 51 on two sides.

Figure 4:
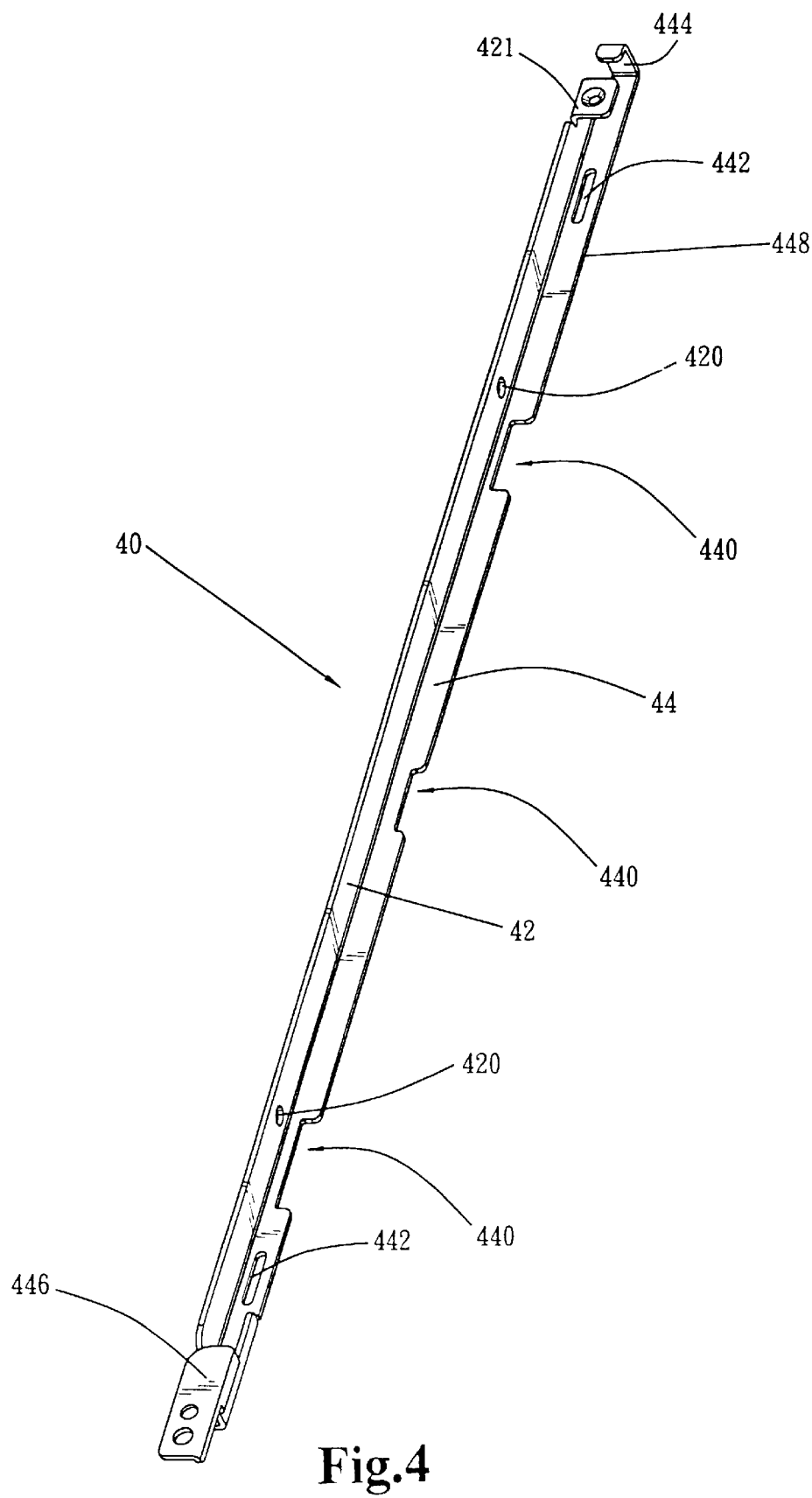
FIG. 4 is a perspective view of the insertion strip of the present invention.

Referring to FIG. 4, the insertion strip 40 is a substantially L-shaped structure including a fixing face 42 and a sliding face 44. The fixing face 42 is formed with multiple fixing holes 420 corresponding to the thread holes 300 of the display face 30, whereby the insertion strips 40 can be fixed with the display face 30 by screws 302 (referring to FIG. 3). In addition, one end edge of the fixing face 42 is formed with a first fixing section 421 bent toward the sliding face 44. The sliding face 44 is formed with multiple notches 440. Each end of the sliding face 44 is formed with a locating hole 442. Furthermore, one end edge of the sliding face 44 is formed with an engaging section 444 which is bent upward and substantially L-shaped. An outer lateral edge of the sliding face 44, which is not adjacent to the fixing face 42 is disposed with a second fixing section 446 bent inward. An outer housing(not shown) can be locked on the fixing sections 421, 446. Also, the casing 50 can be formed with thread holes 550 for locking the outer housing.

Figure 5:
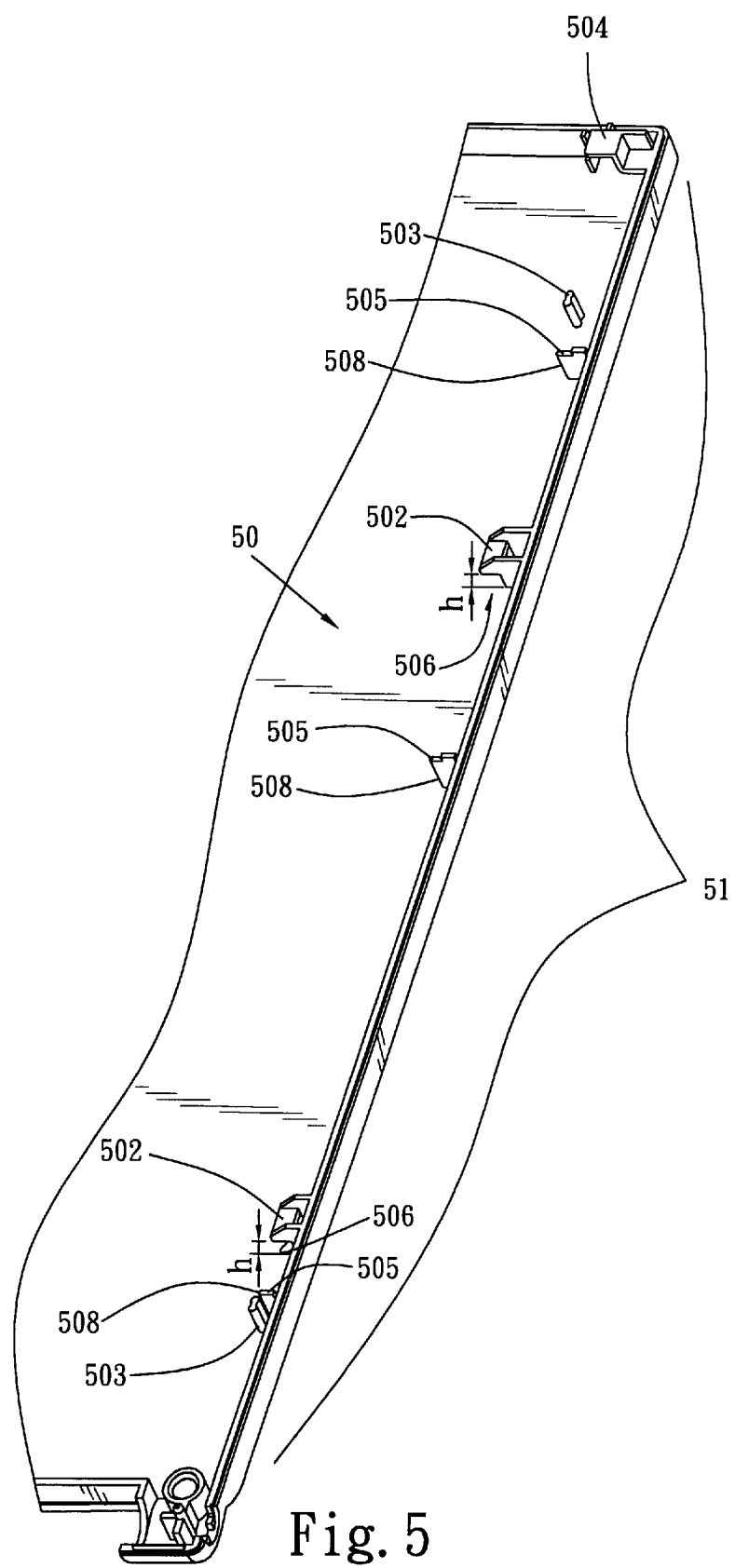
FIG. 5 is a perspective view of a part of the casing of the display panel of the present invention.

Please refer to FIG. 5 which shows a part of the casing 50. The insertion section 51 of the casing 50 includes two insertion bodies 502, two locating posts 503, a stopper section 504 and three auxiliary locating blocks 505. The insertion bodies 502 are connected with the lateral wall of the casing 50 and together with the surface of the casing 50 define a clearance 506. The insertion bodies 502 are positioned corresponding to the notches 440 of the sliding face 44 (referring to FIG. 4). The height h of the clearance 506 is larger than the thickness of the sliding face 44. The locating posts 503 project from the surface of the casing 50 and respectively correspond to the locating holes 442 of the sliding face 44. The stopper section 504 is a substantially U-shaped structure for tightly receiving and engaging with the engaging section 444. The auxiliary locating block 505 is connected with the lateral wall of the casing 50. The end edge 508 of the locating block 505 serves to stop the end edge 448 of the sliding face 44.

Figure 6:
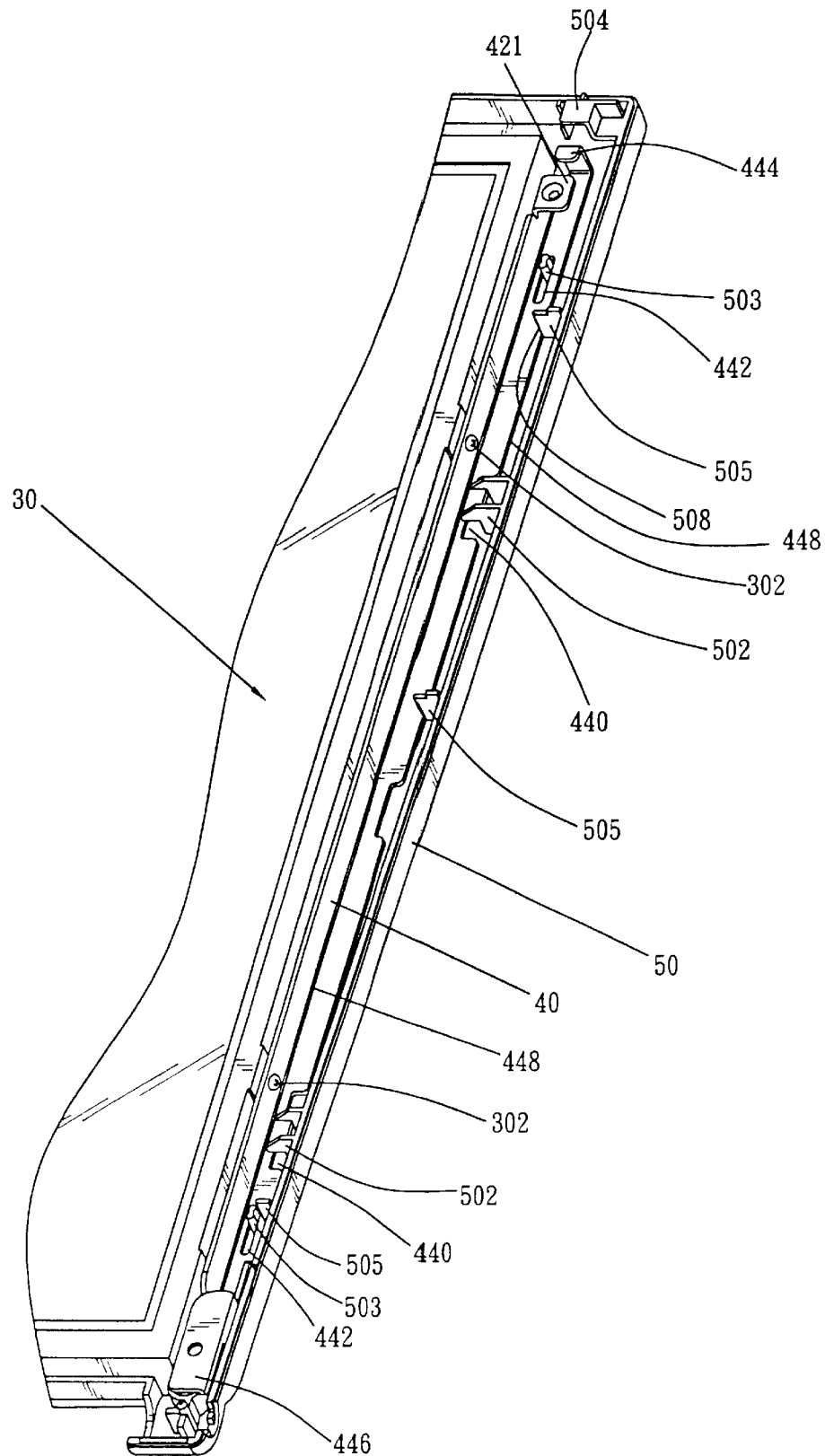
FIG. 6 is perspective view showing the assembling procedure of the display face fixed with the insertion strip and the casing of the present invention.

Please refer to FIG. 6 which shows the assembly of the display face 30 locked with the insertion strips 40 and the casing 50. When assembled, the two insertion strips 40 are first locked with the display face 30 by screws 302 and then the combination of the display face 30 and the insertion strips 40 is placed into the receiving space 500 of the casing 50. With the locating holes 442 of the sliding face 44 aligned with the locating posts 503, the combination can be smoothly placed into the receiving space 500 of the casing 50. At this time, the notches 440 of the sliding face 44 [is right] are positioned at the lower clearance 506 of the insertion body 502. In addition, the end edge 508 of the auxiliary locating block 505 abuts against and stops the end edge 448 of the sliding face 44 so as to assist in more firmly locating the combination on the casing 50.

Figure 7:
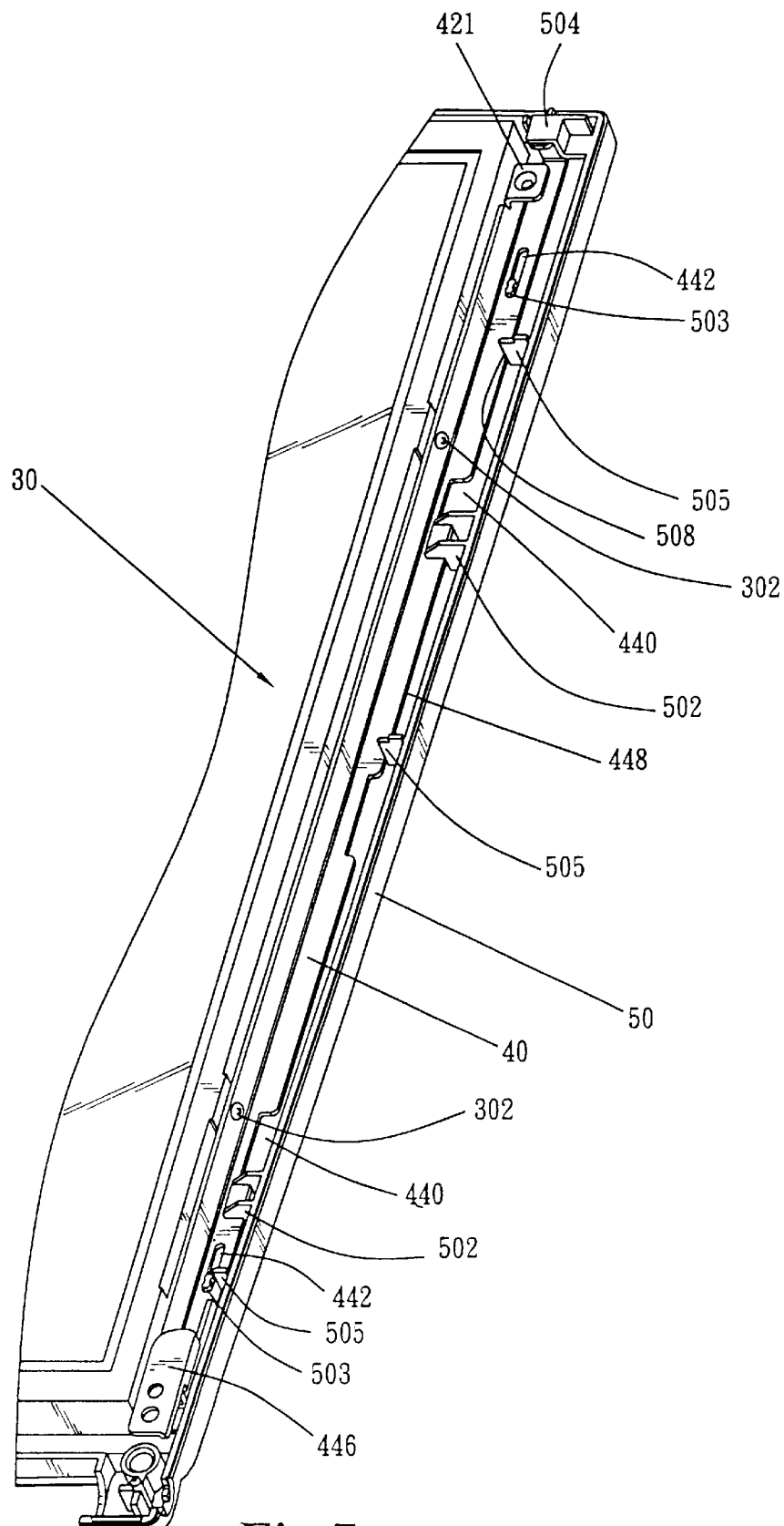
FIG. 7 is a perspective view showing the complete assembly of the display face fixed with the insertion strip and the casing of the present invention.

Please refer to FIG. 7 which shows the complete assembly of the display face 30 and the casing 50. After the combination is fitted into the casing 50, the combination is slid toward one end of the casing 50. At this time, the sliding face 44 beside the notch 440 is slid along a surface of the casing into the lower clearance 506 of the insertion body 502 with the engaging section 444 received in the stopper section 504. Under such circumstance, the combination is firmly engaged with the casing 50 to complete the assembly of the liquid crystal display panel 3. During the assembling procedure of the combination and the casing 50, no screw is used so that the assembling time is greatly shortened and the ratio of good assemblies to defective assemblies is increased.

The above embodiment is only used to illustrate the present invention, not intended to limit the scope thereof. Many modifications of the above embodiment can be made without departing from the spirit of the present invention.

What is claimed is:

1. A liquid crystal display panel structure comprising:

a liquid crystal display face;

two insertion strips each having a fixing fare and a sliding face, the fixing face of the insertion strip being fixedly connected with one side of the display face; and a casing defining a receiving space for receiving the display faced fixed with the insertion strips, each side of the casing having an insertion section that defines a clearance between a portion of the insertion section and a surface of the casing, said clearance being arranged to receive a respective sliding face of the insertion strips, wherein said casing is arranged such that, after the display face fixed with the insertion strips is placed into receiving space of the casing such that said sliding faces engage said surface of the casing, the sliding faces of the insertion strips are slid along said surface toward one end of the casing, the sliding faces thereby being inserted into the clearance defined by said insertion sections, and wherein two ends of the insertion strip are disposed with fixing sections and an outer housing of the liquid crystal display panel structure is locked on the insertion strip or the casing.

2. A liquid crystal display panel structure as claimed in claim 1, wherein the insertion section of the casing includes at least one insertion body which projects from each side of the casing, the insertion body and the casing defining therebetween said clearance, the sliding face of each insertion strip being formed with at least one notch corresponding to a position of the insertion body, whereby after the display face fixed with the insertion strips is placed into the casing, the display face is slid toward one end of the casing to push the sliding face beside the notch into the clearance and engage the display face with the casing.

3. A liquid crystal display panel structure comprising:

a liquid crystal display face;

two insertion strips each having a fixing face and a sliding face, the fixing face of the insertion strip being fixedly connected with one side of the display face; and a casing defining a receiving space for receiving the display faced fixed with the insertion strips, each side of the casing having an insertion section that defines a clearance between a portion of the insertion section and a surface of the casing, said clearance being arranged to receive a respective sliding face of the insertion strips, wherein said casing is arranged such that, after the display face fixed with the insertion strips is placed into receiving space of the casing such that said sliding faces engage said surface of the casing, the sliding faces of the insertion strips are slid along said surface toward one end of the casing, the sliding faces thereby being inserted into the clearance defined by said insertion sections, wherein the insertion section of the casing includes at least one insertion body which projects from each side of the casing, the insertion body and the casing defining therebetween said clearance, the sliding face of each insertion strip being formed with at least one notch corresponding to a position of the insertion body, whereby after the display face fixed with the insertion strips is placed into the casing, the display face is slid toward one end of the casing to push the sliding face beside the notch into the clearance and engage the display face with the casing, and wherein the insertion section of the casing further includes at least one locating post, the insertion strip being formed with a locating hole corresponding to the locating post, whereby the display face can be more easily and quickly assembled with the casing.

* * * * *